Patented July 28, 1931

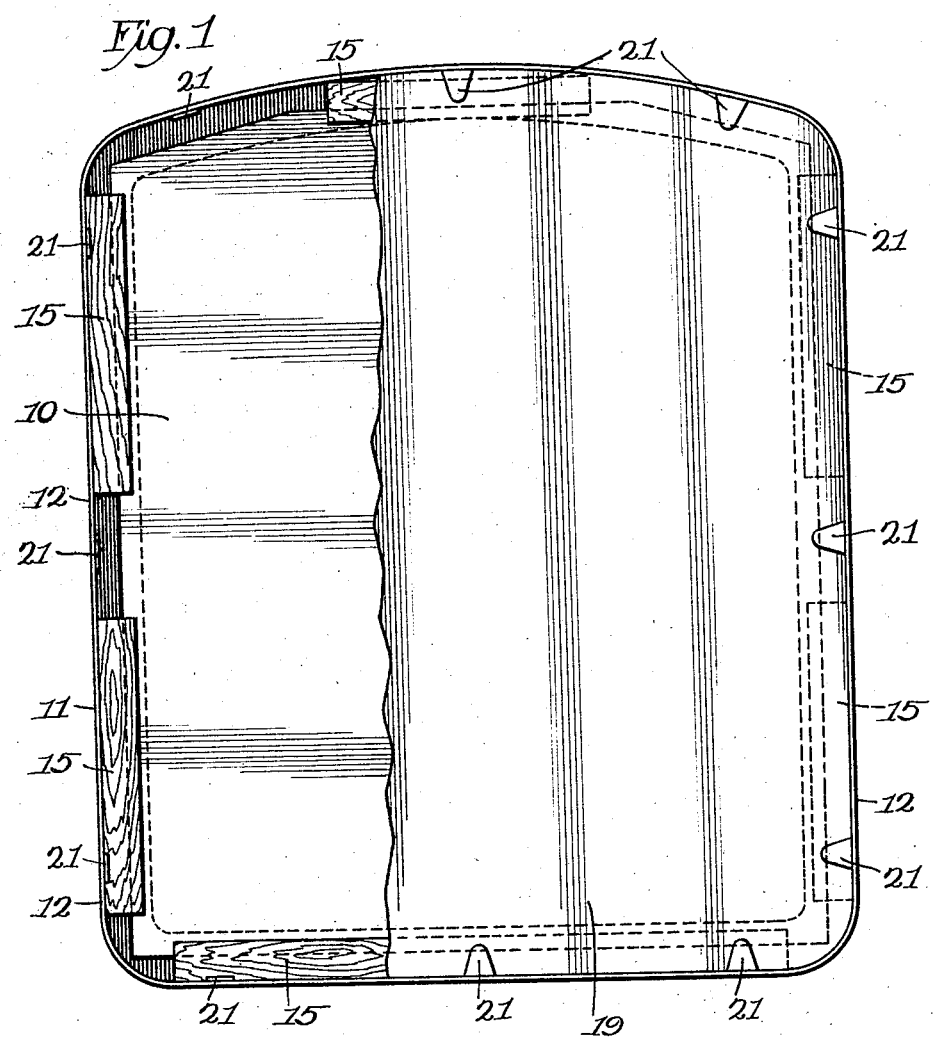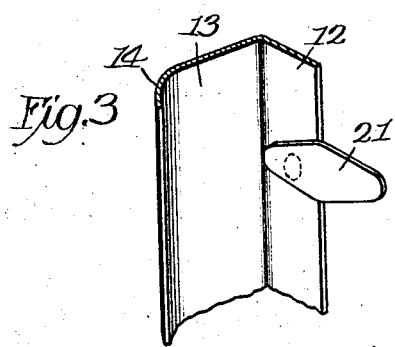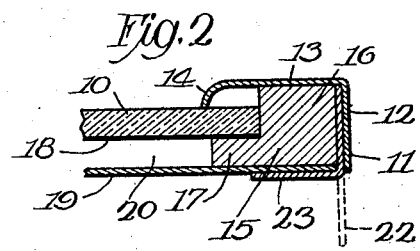

1,815,940

UNITED STATES PATENT OFFICE

HUGO P. ZOERNER, OF KENOSHA, WISCONSIN, ASSIGNOR TO SIMMONS COMPANY, OF NEW YORK, N. Y., A CORPORATION OF DELAWARE

MIRROR FRAME CONSTRUCTION

Application filed November 11, 1926. Serial No. 147,631.

The invention relates to improvements in mirror frame construction and the like, and particularly to sheet metal frame construction of such frames.

The objects of the invention are to provide an improved metal mirror or picture frame which can easily be made of sheet metal; to provide a frame which will be comparatively light in weight, and yet strong and rigid; to provide improved means for fastening a mirror or the like within the frame; to provide a metal frame which will be neat and attractive in appearance, and in general, to provide an improved structure of the class described.

Other objects and advantages will be readily understood by reference to the following specification when read in connection with the accompanying drawings illustrating a selected embodiment of the invention, and in which:

Fig. 1 is an elevation looking at the back of a mirror mounted within a frame, according to the present invention, parts being broken away to better illustrate the same.

Fig. 2 is a section on the line 2—2 of Fig. 1, and

Fig. 3 is a perspective showing the means for locking the mirror in the frame.

Referring now to the drawings, a mirror is indicated at 10, surrounded by a mirror frame 11.

The mirror frame comprises a border element of sheet metal having a continuous outer flange 12 extending transversely of the plane of the mirror, to which is integrally connected, a facing flange 13, the inner curved edge 14, of which, serves to engage and mask the outer edge of the mirror 10.

The glass mirror element 10 is positioned within the border frame by means of a set of filler blocks or strips 15 which, as shown, are preferably made of wood and of L-shaped cross section. The edge of the mirror fits within the angle of the L so that the outer part 16 of the L separates the edge of the mirror from the flange 12 and the inner part 17 of the L separates the silvered back 18 of the mirror from a sheet 19, which serves to protect the said rear silvered surface 18 from abuse or wear. It will be observed that there is a substantial hollow space 20 between the back of the mirror element and the guard sheet 19 so that there is no possibility of the guard sheet rubbing against the treated surface of the mirror unless the article is grossly abused or mishandled.

The mirror filler blocks and guard sheet are held in position by a plurality of lugs 21 which take the form of initially straight diamond shaped flat sheet metal stampings preferably spot welded to the inside of the outer flange 12 of the border frame. Said lugs are relatively thin so that they occupy an insignificant amount of space and do not interfere with the positioning of the blocks 15 in the assembly. While the parts are being assembled in the border frame, the projecting outer ends of the assembly lugs 21 extend rearwardly as shown in dotted line position at 22 in Fig. 2. After the parts have been all assembled and the guard sheet 19 finally put in place, the outer end of the lug is hammered or otherwise bent over its full line position as shown at 23. The lugs 21 thus serve to maintain the entire assembly in rigid and coordinate relation without the necessity of any further adjustable attaching devices.

A mirror frame constructed according to the above description will be comparatively light in weight, and yet of ample strength to serve its purpose, as well as being of attractive appearance. The structure is simple, and the operation of assembling the parts to form the completed mirror involves no difficult operations and can be performed by an unskilled person.

A mirror embodying this invention may readily be mounted between a pair of upstanding posts on an article of furniture, for instance, a dresser, in a practical manner, by providing a pummel (not shown) secured to the inner face of the flange 12, on the sides of the mirror and between the upper and lower blocks or strips 15.

I am aware that various changes in the details of construction as described above may be made without departing from the spirit of the invention, as defined by the following claims, which should be construed as broadly as possible, consistent with the state of the art.

I claim as my invention:

1. In a mirror, the combination of a sheet metal border element which has an outer flange transverse to the mirror plane and an inwardly extending front masking flange, a glass mirror element having its edge concealed by the masking flange, a filler element of L-shaped cross section having one leg interposed between the outer flange and the edge of the mirror and having its other leg located behind the mirror element and overlapping a relatively narrow marginal portion of the latter disposed wholly behind said masking flange, and means for securing said mirror element against rearward movement.

2. In a mirror, the combination of a sheet metal border element which has an outer flange transverse to the mirror plane and an inwardly extending front masking flange, a glass mirror element having its edge concealed by the masking flange, a filler element of L-shaped cross section having one leg interposed between the outer flange and the edge of the mirror and having its other leg located behind the mirror element and overlapping a relatively narrow marginal portion of the latter and disposed wholly behind said masking flange, means for securing said mirror element against rearward movement, and a back cover of comparatively thin sheet material over-lying the mirror element and said filler elements and spaced materially from the back of the mirror element by said overlapping legs.

3. In a mirror, the combination of a glass mirror element, a metal frame having a side flange extending around the glass element, and a masking flange extending inwardly from said side flange into overlapping relation with a marginal portion of said glass element, a removable filler comprising a pair of leg members, one of which fits and is disposed between the edge of the glass element and said side flange to position the glass element in the frame with a surrounding marginal portion of the glass element concealed by said masking flange, the other of said legs extending inwardly and overlapping a marginal portion only of the back of the glass element for holding the same against said masking flange, a guard sheet seated on the back face of said inwardly extending leg, said inwardly extending leg serving to space the guard sheet a sufficient distance rearwardly from the back of said glass element to prevent contact between the glass element and guard sheet under ordinary conditions, and means for holding said parts in assembled relation.

4. In a mirror, the combination of a glass mirror element, a metal frame having a side flange extending around the glass element, and a masking flange extending inwardly from said side flange into overlapping relation with a marginal portion of said glass element, a one-piece, nonmetallic filler block having a recess for receiving a marginal portion of said glass element, a portion of said block fitting between the edge of the glass element and said side flange to position the glass element in said frame with a surrounding marginal portion of the glass element concealed by said masking flange, said block having a rear portion extending inwardly, and overlapping a marginal portion only of the back of the glass element for holding the latter in engagement with said masking flange, a guard sheet seated on the back face of said inwardly extending rear portion, said inwardly extending rear portion being of such thickness as to space the guard sheet a sufficient distance rearwardly from the back of the glass element to prevent contact between the glass element and guard sheet under ordinary conditions, and means for holding said parts in assembled relation.

5. In a mirror, the combination of a glass mirror element, a metal frame having a side flange extending around the glass element, and a masking flange extending inwardly from said side flange into overlapping relation with a marginal portion of said glass element, a removable filler comprising a pair of leg members, one of which fits and is disposed between the edge of the glass element and said side flange to position the glass element in the frame with a surrounding marginal portion of the glass element concealed by said masking flange, the other of said legs extending inwardly and overlapping a marginal portion only of the back of the glass element for holding the same against said masking flange, a guard sheet seated on the back face of said inwardly extending leg, said inwardly extending leg serving to space the guard sheet a sufficient distance rearwardly from the back of said glass element to prevent contact between the glass element and guard sheet under ordinary conditions, and bendable metal ears projecting from said outer flange and bent over said rearwardly spaced back sheet for holding said parts in assembled relation.

HUGO P. ZOERNER.